(No Model.)
H. B. PAYNE.
TELETHERMOMETER.
No. 490,882. Patented Jan. 31, 1893.
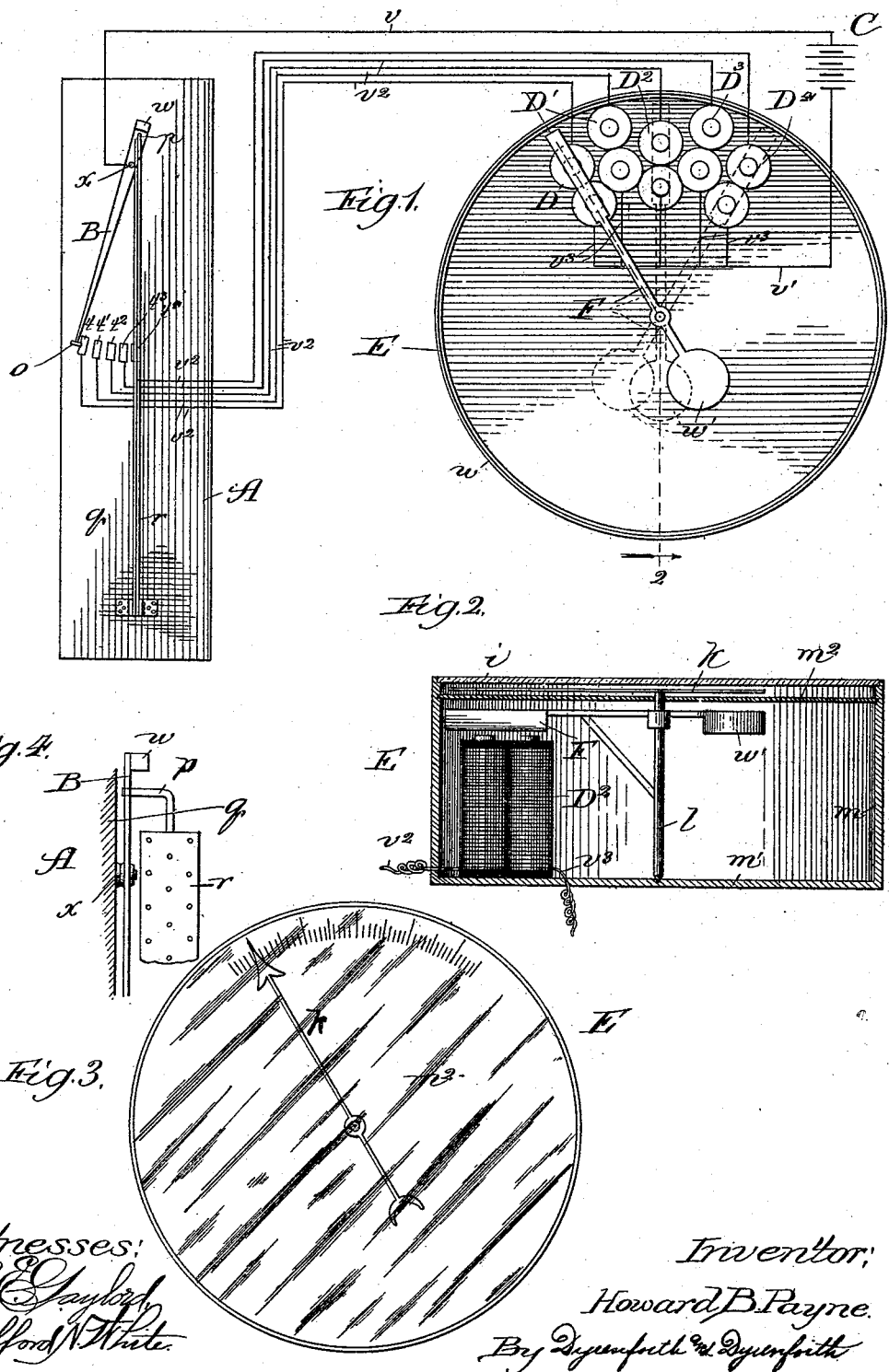
Witnesses:
Chas. E. Gaylord
Clifford N. White
Inventor:
Howard B. Payne.
By Dyrenforth & Dyrenforth
Attys

UNITED STATES PATENT OFFICE.

HOWARD B. PAYNE, OF CHICAGO, ILLINOIS, ASSIGNOR OF ONE-HALF TO DAVID B. VAN SLYKE, OF SAME PLACE.

TELETHERMOMETER.

SPECIFICATION forming part of Letters Patent No. 490,882, dated January 31, 1893.

Application filed May 20, 1892. Serial No. 433,714. (No model.)

*To all whom it may concern:*

Be it known that I, HOWARD B. PAYNE, a citizen of the United States, residing at Chicago, in the county of Cook and State of Illinois, have invented a new and useful Improvement in Electric Temperature Apparatus, of which the following is a specification.

My invention relates to an improvement in the class of electro-thermostatic or electro-telethermometric apparatus, wherein the thermostat or telethermometer is caused by the effect upon it of the temperature in a room or inclosure to close either of two or more circuits including in the one instance a valve, and in the other instance a temperature-indicator, annunciator, or the like, and thereby actuate the latter to produce variation or indication of the temperature, as the case may be, in the surroundings of the instrument.

The objects of my improvement are to provide a simple, novel and especially efficient construction of the thermostat or telethermometer portion of an apparatus of the class referred to; to provide a novel and especially efficient construction of electric indicator for use with the telethermometer of a temperature-indicating apparatus; and to provide a generally improved construction of electro-telethermometric apparatus for use in indicating the temperature in a room or inclosure.

In the accompanying drawings, Figure 1 is a view in elevation, in the nature of a diagram, of my improved apparatus, with the dial, and parts surmounting it, removed from the indicator-portion to display details of construction; Fig. 2 is a section through the indicator, taken at the line 2 on Fig. 1 and viewed in the direction of the arrow; Fig. 3 is a face-view of the indicator; and Fig. 4 is a broken view in side elevation of the bar of material differentially affected by temperature and the contact-finger connected with and actuated by it.

A is a thermostat, or telethermometer (depending whether it be used with a valve for regulating temperature or with an indicator, as shown) comprising a bar composed of two different metals or materials differentially affected by temperature whereby, with one end of the bar $r$ fastened to a suitable base $q$, it will be bent toward its opposite end, by the effect upon it of the temperature. I provide a contact-finger B pivoted at $x$ on the base $q$ and so connected with the free end of the bar $r$ that bending of the latter will turn the finger on its pivot, the connection shown for the purpose comprising an arm $p$ extending from the free end of the bar and passing through the contact-finger above its pivotal support. The contact-finger B forms one terminal of an electric generator (battery) C, having one of its poles connected with the finger through the medium of a conductor $v$. The upper end of the contact-finger carries a weight $w$, projecting forward and which may be a counterbalancing weight, though its primary function is to maintain the opposite contact-end of the finger, which carries an anti-friction roller $o$, firmly against the faces of contacts $t$, $t'$, $t^2$, $t^3$, $t^4$, provided in any desired number, and being connected, respectively, each by a conductor $v^2$ with one end of an electro-magnet D, D', D$^2$, D$^3$, D$^4$, provided in number, which should correspond with the number of contacts, on an electric indicator E. From their opposite ends the magnets are connected by a conductor $v'$ and branches $v^3$ thereof with the generator C.

The electro-magnets are supported in a case $m$ containing a central perpendicular arbor $l$ pivotally supported in the base $m'$ and cover $m^2$ of the case, and carrying an armature F extending over the plane of the poles of the electro-magnets and counterbalanced, as by a weight $w'$ at its rear end. The cover $m^2$ forms a dial having marked upon it indications of temperature in degrees; and a pointer $k$ extends over the dial, being carried by the arbor. The case may be provided with a glass cover $i$.

The device A is presumed to be located in a room or inclosure, the temperature of which is to be indicated while the location of the indicator E should be conveniently accessible to the person responsible for the regulation of the heat-supply, as in the engineer's or furnace room.

The apparatus, as shown and described, operates as follows: For the purpose of the explanation the condition of the bar $r$ may be normally that of maintaining the contact-finger B on, say, the contact $t'$, at which it would be brought by the effect on the bar of the desired normal temperature of the room. In that position of the finger B it will have closed the circuit from the contact $t'$ and its conductor $v^2$ through the magnet D′, conductor $v'$, battery C, conductor $v$ and finger B back to the contact $t'$, thereby energizing the magnet D′ and causing it to attract to it and hold the armature from any position it may be in the range of the series of magnets; and the armature turned by the attraction will carry with it the dial-finger $k$ and cause it to indicate on the dial $m^2$ the degree showing the condition of the temperature of the room containing the device A to be normal. As shown in Fig. 1, the contact-finger B is on the contact $t$, to which position it has been moved by bending of the bar $r$ toward the right, under the effect, say, of a fall in the temperature of the room, the turning-operation of the finger B being produced by the engagement of the arm $p$, in the bending of the bar, with the contact-finger. On the finger B reaching the contact $t$, it opened the circuit through the magnet D′ and closed it through the magnet D, thereby energizing the latter and causing it to attract to it the armature and turn the dial-finger to indicate on the dial $m^2$ a fall in the temperature of the room below the normal. The indication thus produced will notify the person in charge of the heating apparatus of the abnormal condition of the temperature in the room, and indicate to him the necessity for attending to his fire.

From the foregoing description of the operation, the effect of any change, within predetermined degrees, in the temperature of the room, the temperature of which is to be regulated, on the device A and through the latter on the indicator E will be readily understood; though it may be added, for the sake of clearness, that bending of the bar $r$ in the opposite direction from that described, under the effect of a rise in temperature beyond that referred to as normal, will actuate the finger B in the contrary direction and produce corresponding indications on the indicator E.

While I have shown and particularly described my apparatus as involving a peculiar construction of telethermometer electrically combined with a peculiar construction of indicator, I do not wish to be understood as limiting my invention to that particular combination, except in such of the appended claims as specify it; for the construction involved in my device A adapts it for advantageous use with other constructions of indicator, and also a thermostat with a valve, and the indicator E may also be used advantageously with telethermometers differing in construction from that herein described.

What I claim as new and desire to secure by Letters Patent is—

1. In an electric temperature apparatus, the combination of a bar $r$ formed of material differentially affected by temperature and fastened at one end to a base, a contact-finger B forming one terminal of a generator and pivotally supported on the said base and connected at one side of its pivot directly with the free end of the said bar, and contacts $t$, $t'$, $t^2$, &c., supported in the plane of movement of the free end of the finger B and forming the opposite terminal of said generator, substanially as described.

2. In an electrical apparatus for use in indicating temperature, the combination with an electric generator and a telethermometer in a circuit thereof, of an indicator E comprising a case $m$ supporting electro magnets in circuit with the thermostat, an arbor $l$ pivotally supported in the case and carrying an armature F and an index-finger $k$, and a dial $m^2$, substantially as described.

3. An electrical apparatus for use in indicating temperature comprising, in combination with a battery, C, a telethermometer A having a base $q$ carrying the bar $r$, a pivotal contact-finger B connected with one pole of the battery and engaged by the said bar, and contacts, and an indicator E having electromagnets connected, each, with one of said contacts and with the opposite pole of the battery, a pivotal armature F carrying a dial-finger $k$, and a dial $m^2$, the whole being constructed and arranged to operate substantially as described.

HOWARD B. PAYNE.

In presence of—
M. J. FROST,
J. N. HANSON.